US012741612B2

(12) United States Patent
Peyrot et al.

(10) Patent No.: US 12,741,612 B2
(45) Date of Patent: Sep. 22, 2026

(54) RAIN SENSOR SYSTEM AND VEHICLE

(71) Applicant: VALEO SCHALTER UND SENSOREN GMBH, Bietigheim-Bissingen (DE)

(72) Inventors: Donald Peyrot, Prague (CZ); Vit Kadubec, Prague (CZ); Juraj Fajta, Prague (CZ); Michal Hejduk, Prague (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 223 days.

(21) Appl. No.: 18/555,255

(22) PCT Filed: Apr. 13, 2022

(86) PCT No.: PCT/EP2022/059814
§ 371 (c)(1),
(2) Date: Oct. 13, 2023

(87) PCT Pub. No.: WO2022/219011
PCT Pub. Date: Oct. 20, 2022

(65) Prior Publication Data

US 2024/0190388 A1 Jun. 13, 2024

(30) Foreign Application Priority Data

Apr. 13, 2021 (DE) ..................... 10 2021 109 171.3

(51) Int. Cl.
*B60S 1/00* (2006.01)
*B60S 1/08* (2006.01)

(52) U.S. Cl.
CPC .................................. *B60S 1/0844* (2013.01)

(58) Field of Classification Search
None
See application file for complete search history.

(56) References Cited

U.S. PATENT DOCUMENTS 6,353,392 B1 * 3/2002 Schofield ........... B60H 1/00785 340/602
2004/0141057 A1 7/2004 Pallaro et al.
(Continued)

FOREIGN PATENT DOCUMENTS

CN 111717164 A 9/2020
DE 103 26 854 A1 12/2004
(Continued)

OTHER PUBLICATIONS

German International Search Report issued in corresponding German Patent Application No. DE 10 2021 109 171.3 dated Nov. 24, 2021 (6 pages).
(Continued)

*Primary Examiner* — James M McPherson
(74) *Attorney, Agent, or Firm* — Osha Bergman Watanabe & Burton LLP

(57) ABSTRACT

A rain sensor system for measuring a quantity of rain on a window of a vehicle is provided. The rain sensor system comprises a camera device configured to capture images of an area surrounding the vehicle using camera optics; and a rain sensor including a transmitter and a receiver, the transmitter being configured to emit or transmit light and the receiver being configured to receive measurement light that is emitted or transmitted by the transmitter and guided to the receiver by the window. The transmitter and the receiver are arranged at a distance (d) from each another, and the receiver and the camera optics of the camera device are different components.

14 Claims, 7 Drawing Sheets

(56) References Cited

U.S. PATENT DOCUMENTS

2008/0116379 A1 5/2008 Teder
2010/0155584 A1* 6/2010 Mack .................... G01N 21/94 250/227.25
2011/0273564 A1 11/2011 Seger et al.
2014/0196525 A1 7/2014 Niemann et al.
2014/0300738 A1 10/2014 Mueller
2016/0272165 A1 9/2016 Hsiao et al.
2017/0190319 A1* 7/2017 Kim ...................... B60S 1/0822
2018/0029563 A1* 2/2018 Beloe ................. B60H 1/00785
2018/0170316 A1* 6/2018 Park ...................... G01N 21/45
2018/0175491 A1* 6/2018 DeMersseman ....... H04N 23/57

FOREIGN PATENT DOCUMENTS

DE 10 2004 015 040 A1 10/2005
DE 10 2004 037 871 A1 3/2006
DE 10 2006 010 671 A1 9/2007
DE 10 2008 044 003 A1 5/2010
DE 10 2011 101 744 A1 11/2012
DE 10 2011 103 302 A1 12/2012
DE 10 2013 000 751 A1 7/2014
DE 10 2014 214 710 A1 1/2016
EP 1 580 092 B1 9/2015

OTHER PUBLICATIONS

International Search Report issued in corresponding International Application No. PCT/EP2022/059814 mailed Jul. 26, 2022 (4 pages).
Written Opinion issued in corresponding International Application No. PCT/EP2022/059814 mailed Jul. 26, 2022 (7 pages).
Office Action issued by the CNIPA for corresponding Chinese Patent Application No. 202280028276.3, mailed Apr. 2, 2026 (17 pages).

* cited by examiner 5
8
105
104
9
106
7
4
101

RAIN SENSOR SYSTEM AND VEHICLE

The invention relates to a rain sensor system and to a vehicle with such a rain sensor system.

Rain sensor systems can be used in vehicles to measure a quantity of water such as rain on a windscreen of a vehicle. DE 10 2011 101 744 A1 discloses an example for a rain sensor which includes an optical transmitter for sending light onto the window and a receiver for receiving the light sent by the optical transmitter and reflected by the window. The optical transmitter and the receiver are provided together in the same housing. The quantity of rain on the window is determined based on the light signal received by the receiver.

Nowadays, vehicles often comprise a camera device for filming an area around the vehicle. It is desirable to reduce a surface of the window which is covered by the camera device and the rain sensor to increase the field of view of a driver. In this view, EP 1 580 092 B1, DE 10 2008 044 003 A1, DE 10 2006 010 671 A1 and DE 10 2014 214 710 A1 disclose a rain sensor and camera optics sharing some optical elements. For example, a camera sensor of the camera device is also used as the receiver of the rain sensor.

It is one objective of this invention to provide an improved rain sensor system.

According to a first aspect, a rain sensor system for measuring a quantity of rain on a window of a vehicle is provided. The rain sensor system comprises:

- a camera device configured to capture images of an area surrounding the vehicle using camera optics; and
- a rain sensor including a transmitter and a receiver, the transmitter being configured to emit or transmit light and the receiver being configured to receive measurement light that is emitted or transmitted by the transmitter and guided to the receiver by the window; wherein
- the transmitter and the receiver are arranged at a distance from each another; and
- the receiver and the camera optics of the camera device are different components.

Arranging the mechanically independent transmitter and receiver at a distance from each another is advantageous in that their positions can be adjusted independently. The positions of the transmitter and the receiver can be adapted depending on the size and shape of the window and/or the camera device. This improves the flexibility of where the rain sensor is arranged on the window while optimizing the sensing by the rain sensor and/or the design of the rain sensor device. The receiver and the camera optics being different components is further advantageous in that the rain sensor does not need to be optically synchronized with the camera device. Thereby, a rain sensor system with a greater design flexibility is achieved.

The vehicle may be embodied as a passenger vehicle, such as a car, bus, truck, train, plane or the like. The window of the vehicle is preferably a windscreen (front window) or a back window of the vehicle. The window can be made of glass. Measuring a quantity of rain on the window can be useful to accordingly control the wipers.

The camera device can be installed behind the window, on an interior side of the vehicle. It can be used to capture images, in particular video images, of the surroundings of the vehicle. The camera device can also be referred to as a dashcam, a front camera and/or a car digital video recorder. The area surrounding the vehicle can correspond to the field of view of the camera device. The area surrounding the vehicle is preferably located in front of the vehicle. The camera optics are all optics used to capture the images of the area surrounding the vehicle.

The transmitter either generates light or transmits received light. In both cases, light emitted or transmitted by the transmitter is guided towards the window such as to couple the light into the window. If the transmitter generates light, it can be implemented as a light emitting diode (LED). To adjust the divergence of the light emitted by the LED, the transmitter may further include a lens, in particular a Fresnel lens, free-form optics and/or holographic elements. If the transmitter transmits light, it can include one or multiple optical elements such as lenses.

Preferably, the transmitter includes one or multiple prisms, blazed gratings, diffraction gratings, holographic elements, free-form optics or the like.

The window may reflect the received light on its inside and thereby guide the light towards the receiver. When no water is present on the window, the window may perform multiple total reflections on the light between the transmitter and the receiver. In particular, the light gets totally reflected at window-air interfaces, in particular because the refractive index of the glass forming the window is higher than that of air. The refractive index of the receiver is preferably higher than the refractive index of the window. As a result, at the window-receiver interface, the light leaves the window and reaches the receiver.

The receiver can be a photoelectric receiver, a photodiode, an inverted LED or any other light sensitive opto-electronic element. The receiver can for example detect how much light is incident on the receiver and/or at which angle. Depending on how much water, in particular rain, is present on the window, the transmission of light by the window varies. In particular, as compared to the case where no water is present on the window, a window with water droplets transmits less light to the receiver due to a loss in the total reflection in the window.

The transmitter and the receiver are in particular arranged on the same side of the window, in particular on an interior of the vehicle. The transmitter and the receiver are mechanically independent (uncoupled) elements which in particular are not attached to each other. In other words, the transmitter and the receiver can be displaced independently from the respective other element. Preferably, the transmitter and the receiver are not housed in the same housing.

The transmitter and the receiver being arranged at a distance from each another in particular means that they are arranged at different locations along the window with a (for example predetermined) distance therebetween. The transmitter and the receiver are preferably arranged far enough from each another so that the light is reflected multiple times in the window between the transmitter and the receiver. Thereby, the accuracy of the detection made by the receiver is increased.

The receiver and the camera optics being different components in particular means that they are separate units, which are preferably mechanically and/or optically uncoupled from each other. The transmitter and the camera optics may also be different components.

The transmitter and the receiver can be optically independent from the camera optics. "Optically independent" means that the transmitter and the receiver do not share any optics with the camera optics of the camera device. In other words, the optics of the transmitter for emitting and/or transmitting light are not adapted to be used when capturing images of the surrounding area of the vehicle. Further, the optics of the receiver for receiving the light reflected by the window are not adapted to be used when capturing images of the surrounding area of the vehicle. Expressed differently, the camera optics uses a first light path for capturing images of the area surrounding the vehicle, while the transmitter and the receiver use a second light path for detecting the quantity of rain on the window, the first and the second light path being different from each other. Further, the wavelength of the light used by the rain sensor can be different from the wavelength used by the camera device when capturing images of the surrounding area to avoid any interferences between the lights.

According to an embodiment, the rain sensor system further includes an analysis unit which is configured to analyze the received measurement light to determine the quantity of rain on the window.

The analysis of the received measurement light can be a determination of the intensity of the received measurement light and/or of an incidence angle of the received measurement light on the receiver, in particular as a function of time. The analysis unit may be connected to the receiver such that the receiver transmits the received measurement light to the analysis unit. If the receiver includes a photodiode, the receiver may transmit an electric current which is proportional to the received measurement light to the analysis unit.

The analysis unit may determine the quantity of rain as a digital signal. The analysis unit may output the determined quantity of rain on a screen or to a control unit. The control unit may control an operation of the window wipers in accordance with the quantity of rain determined by the analysis unit.

A preferable solution provides that the transmitter and the receiver are arranged on the window such that the light that is emitted or transmitted by the transmitter is reflected by total reflection at least once on an outer surface of the window and at least once on an inner surface of the window. This allows to achieve a long measurement area with no additional elements on the inner surface of the window.

According to a further embodiment, the transmitter and the receiver are arranged along different sides of the camera device.

The transmitter and the receiver are arranged on different side (preferably on opposite sides) of at least a portion of the camera device, in particular of the camera optics. Preferably, the transmitter and receiver are arranged symmetrically around the camera device, thereby improving the design of the rain sensor system.

According to a further embodiment, the rain sensor system further comprises a camera cover configured to at least partially cover the camera device; wherein the transmitter and/or the receiver is arranged in, on or along the camera cover.

The camera cover may be an element arranged between the window and the camera device to cover and hide the camera device when viewed from outside the vehicle. In particular, the camera has an opening for a camera lens of the camera device to allow capturing the surrounding area, but covers elements of the camera device such as a processing unit or the like. The camera cover may be part of a housing of the camera device. The camera cover may be made of opaque plastic.

The transmitter and receiver being arranged in the camera cover in particular means that the camera cover comprises openings and/or seats for accommodating the transmitter and/or receiver. Such an arrangement is advantageous because the transmitter and/or receiver are integrated into the camera cover, thereby reducing the total size of the rain sensor system.

The transmitter and receiver being arranged on the camera cover in particular means that the transmitter and/or receiver are arranged between the window and the camera cover. A surface of the window which is used by the rain sensor system is thereby advantageously reduced.

The transmitter and/or receiver being arranged along the camera cover in particular means that the transmitter and receiver are arranged along a side or edge of the camera cover, in particular touching the camera cover.

According to a further embodiment, the transmitter and the receiver are arranged along one or several edges of the camera cover or in one or several openings in the camera cover.

An edge in particular designates a side of the camera cover.

According to a further embodiment, the transmitter and the receiver are arranged on opposite edges of the camera cover or on different extremities of the same edge.

According to a further embodiment, the transmitter and/or the receiver are configured to be moved independently from the camera cover and/or the camera device.

The transmitter and/or the receiver may be independently moveable with respect to the camera cover, particularly without breaking any parts.

According to a further embodiment, the distance between the transmitter and the receiver is at least 5 cm, in particular at least 7 cm or 10 cm.

According to a further embodiment,

- the transmitter includes a light emitting diode (LED) for emitting the light and/or an optical element (first optical element) for collimating the emitted light; and/or
- the receiver includes an optical element (second optical element) for bundling the received measurement light.

The first optical element adjusts the divergence of the light beams transmitted by the transmitter. To collimate the light, the transmitter may include a lens, in particular a Fresnel lens, free-form optics, holographic elements, prisms, blazed gratings, diffraction gratings, or the like as the first optical element. The second optical element may be a lens, in particular a Fresnel lens, free-form optics, holographic elements, prisms, blazed gratings, diffraction gratings, or the like. Preferably, the second optical element is identical to the first optical element but inverted. The light received at the receiver then follows the inverse path from the path followed at the transmitter.

According to a further embodiment, the light emitted by the transmitter has a divergence between 3 and 6 degree. This creates some tolerance regarding the positioning of the receiver relative to the transmitter.

According to a further embodiment, the rain sensor system further includes a processor unit for electrically powering and/or controlling (i) the transmitter and/or the receiver and (ii) the camera device.

The same processor unit is used for powering and/or controlling both the rain sensor and the camera device. Although the camera optics and the rain sensor optics are not shared, the camera device and the rain sensor may share the same processor unit. In other words, the rain sensor and the camera device may be electrically coupled. This is advantageous in that a single processor unit is needed for the entire rain sensor system including the rain sensor and the camera device. Thereby, an amount of space required for the processor unit as well as costs can be reduced.

Preferably, the processor unit is used to control the capturing of the images of the area surrounding the vehicle with the camera optics. The processor unit may comprise all the electronics of the rain sensor. In other words, the rain sensor may only include optic elements and optionally a housing and/or an interface for connecting with the camera device.

For coupling the camera device and the rain sensor, electric cables, optical fibers and/or flexible flat cables may be used.

According to a further embodiment, the camera device includes a light emitting element configured to emit light and/or a light receiving element configured to receive light; and the light emitting element is connected to the transmitter through a first optical fiber configured to transmit the light emitted by the light emitting element to the transmitter and/or the light receiving element is connected to the receiver through a second optical fiber configured to transmit the measurement light received by the receiver to the light receiving element.

The light emitting element and/or the light receiving element can be physically located on the camera device, for example within the housing of the camera device. The light emitting element and/or the light receiving element are preferably only used for the rain sensor and are in particular not used to capture images of the area surrounding the vehicle. In particular, the light emitting element and/or the light receiving element are not part of the camera optics. The light emitting element and/or the light receiving element may however be optically coupled to the transmitter and/or the receiver to transmit light thereto and/or receive light therefrom. The optical coupling can be performed using optical fibers. The transmitter and/or the receiver preferably comprise the previously described first and/or second optical elements.

According to a further embodiment, the processor unit further includes a determination element for determining an amount of rain of the window based on the light received by the light receiving element.

The analysis of the amount of rain may be performed using the same processor unit as the one controlling the camera device, in particular the capturing of the images of the surrounding area. This reduces costs and space required for processor units.

According to a further embodiment, the light emitting element and/or the light receiving element are part of the processor unit.

The processor unit may be a printed circuit board (PCB), in particular a main board PCB (or motherboard) of the camera device. The PCB may have the light emitting element and/or the light receiving element arranged thereon. The PCB may further include mechanical coupling elements for coupling the first and second optical fibers with the PCB.

According to a further embodiment, the rain sensor system comprises several transmitters and/or several receivers.

This can improve the reliability of the detection of how much rain is on the window, and can thereby increase the accuracy and reliability of the rain sensor system. Alternatively or in addition thereto, using multiple transmitters and/or receivers enlarges the detection area of the rain sensor.

According to a second aspect, a rain sensor for the rain sensor system according to the first aspect or according to an embodiment thereof is provided. The rain sensor includes a transmitter and a receiver, the transmitter being configured to emit or transmit light and the receiver being configured to receive measurement light that is emitted or transmitted by the transmitter and guided to the receiver by the window; wherein the transmitter and the receiver are arranged at a distance from each another; and the receiver and the camera optics of the camera device are different components.

Features described in conjunction with the rain sensor system according to the first aspect or according to an embodiment thereof equally apply to the rain sensor according to the second aspect.

According to a third aspect, a vehicle comprising the rain sensor system according to the first aspect or according to an embodiment thereof is provided.

Features described in conjunction with the rain sensor system according to the first aspect or according to an embodiment thereof equally apply to the vehicle according to the third aspect.

The invention has been described in terms of different embodiments. It is to be understood that one or more features of any one embodiment may be combinable with one or more features of the other embodiments. In addition, any single feature or combination of features in any of the embodiments may constitute additional embodiments.

Further embodiments or aspects of the invention are subject to the dependent claims and the examples which are described in the following with reference to the figures.

In the figures, like elements are denoted with the same reference numerals unless otherwise indicated.

Figure 1:
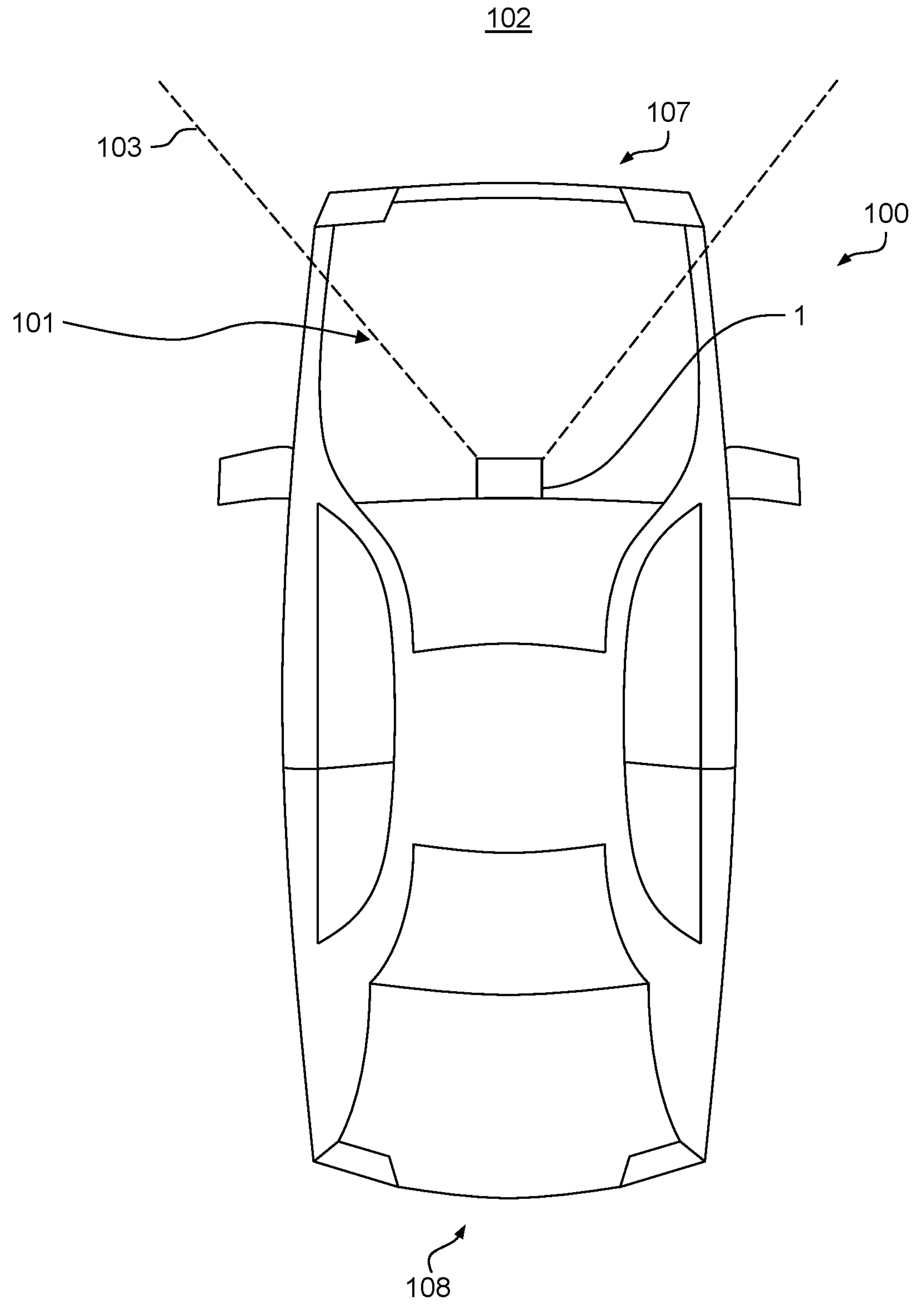
FIG. 1 shows a view of a vehicle.

FIG. 1 shows a view of a vehicle 100, which is a car. On its front 107, the car 100 has a window 101, which is a windscreen. On an interior of the car 100, a rain sensor system 1 is mounted to the window 101. The rain sensor system 1 is mounted at or near a rear-view mirror (not shown) of the car 100.

Figure 2:
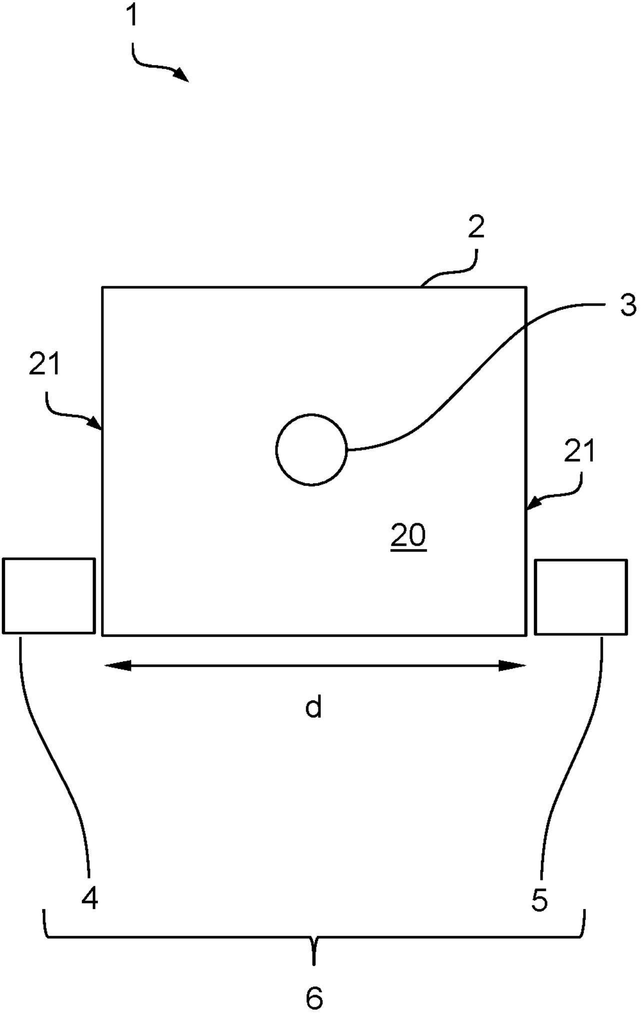
FIG. 2 shows a rain sensor system according to a first embodiment.

The rain sensor system 1 of the car 100 is for example a rain sensor system 1 according to a first embodiment, which is shown in FIG. 2. FIG. 2 shows the side of the rain sensor system 1 which is positioned against and/or towards the window 101 on an interior of the car 100. In other words, FIG. 2 shows the rain sensor system 1 as it is visible from outside the car 100, through the window 101.

As shown in FIG. 2, the rain sensor system 1 includes a camera device 2 and a rain sensor 6. The camera device 2 includes camera optics 3 including a lens and the like. The camera optics 3 are positioned such that their field of view 103 extends to the front 107 of the car 100. Using the camera optics 3, the camera device 2 can monitor an area 102 surrounding the vehicle 100 (see FIG. 1). The area 102 is delimited by the field of view 103 of the camera optics 3.

The camera optics 3 are visible from outside the vehicle 100. However, a camera cover 20 hides the remaining elements of the camera device 2. These hidden elements for example include control units for the camera optics 3 and the like.

The rain sensor 6 comprises a transmitter 4 and a receiver 5. The transmitter 4 and the receiver 5 are two separate optical elements, which can be moved independently with respect to each other. The transmitter 4 and the receiver 5 can further be moved independently with respect to the camera device 2 (for example during a positioning and/or mounting of the transmitter 4 and receiver 5 on the window 101). In the rain sensor system 1 of the first embodiment, the transmitter 4, the receiver 5 and the camera device 2 are entirely independent and uncoupled units, which do not share any resources (optical, electrical or the like) at all. In detail, the receiver 5 and the camera optics 3 are different components.

The transmitter 4 and the receiver 5 are mechanically fixed to the window 101 with a silicone gel for refractive index matching placed between the transmitter 4 and the window 101 and between the receiver 5 and the window 101.

The transmitter 4 and the receiver 5 are arranged at a distance d from each other with the camera device 2 being arranged between the transmitter 4 and the receiver 5. As shown in FIG. 2, the transmitter 4 and the receiver 5 are arranged along opposite sides (edges) 21 of the camera cover 20. In the embodiment of FIG. 2, the rain sensor system 1 is symmetric about a central vertical axis of the camera cover 20.

Figure 3:
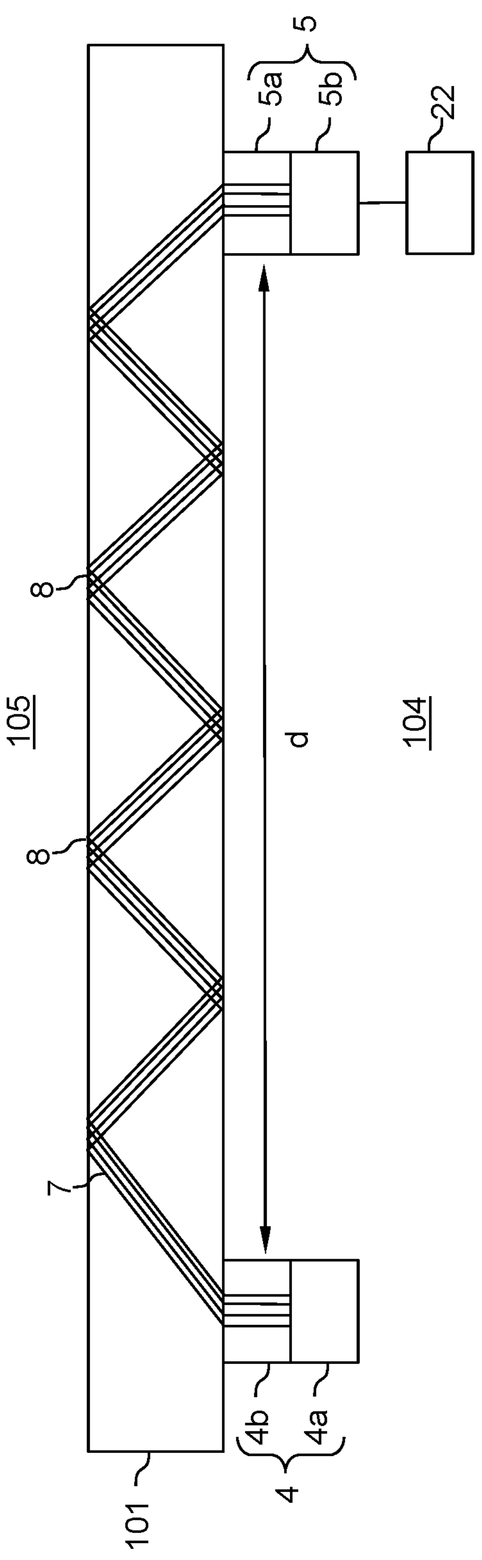
FIG. 3 shows a first example of light propagating in the window without rain.
Figure 4:
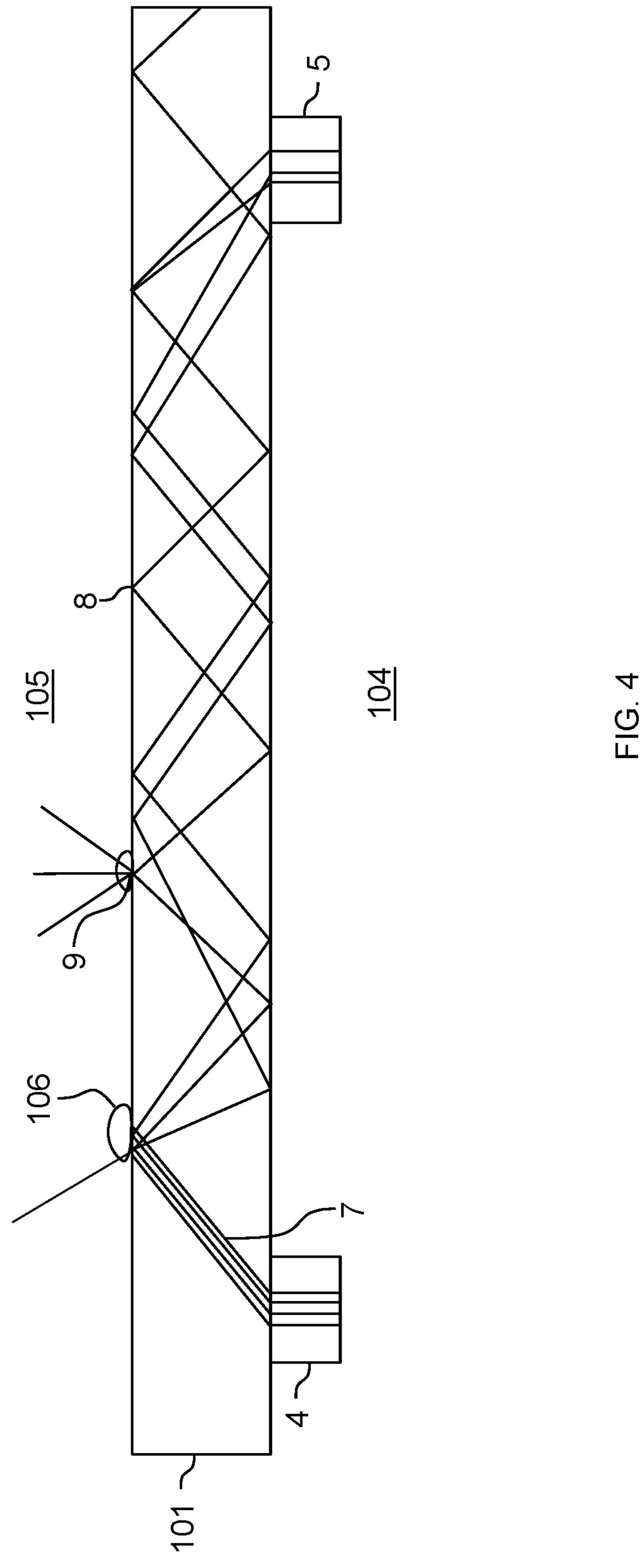
FIG. 4 shows light propagating in the window with rain.
Figure 5:
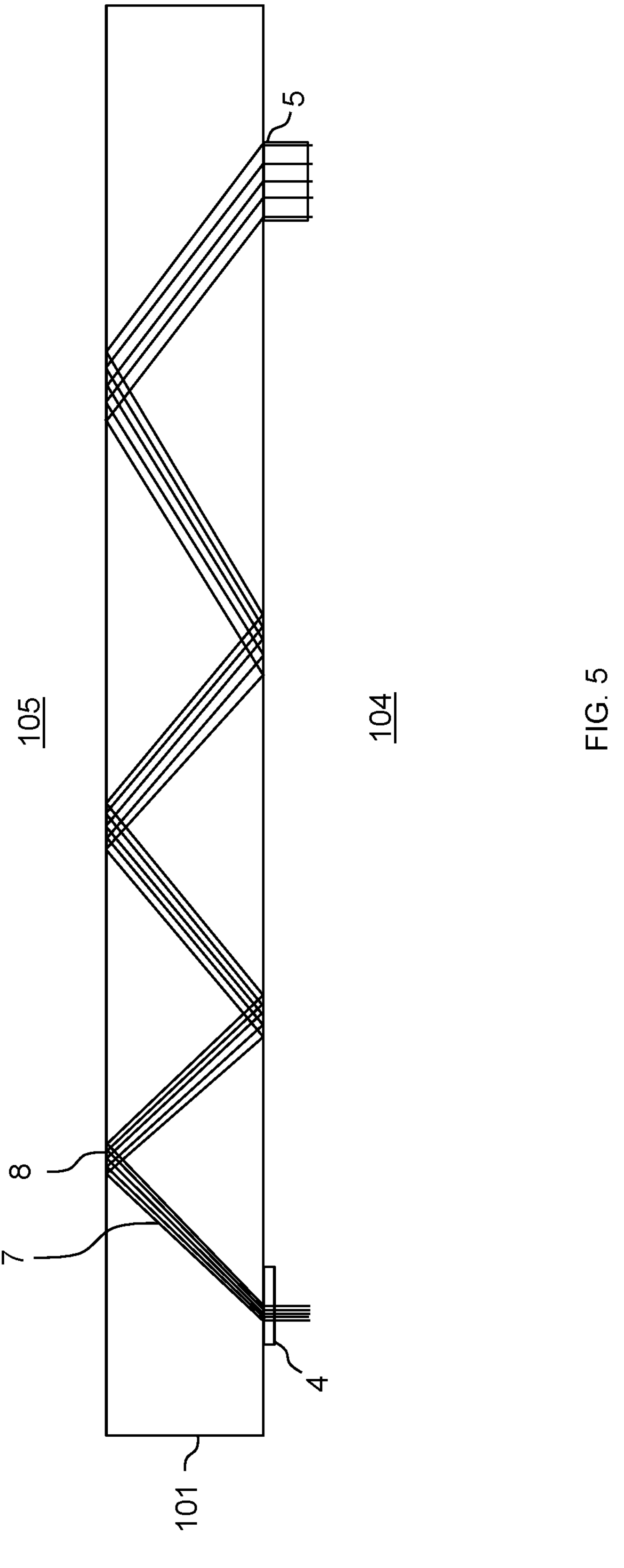
FIG. 5 shows a second example of light propagating in the window without rain.

The operating principle of the rain sensor 6 is explained in view of FIGS. 3 and 4. The interior 104 and the exterior 105 of the car 100 are separated by the window 101. The transmitter 4 includes an LED 4*a* for emitting light and a lens 4*b* arranged between the LED 4*a* and the window 101 for collimating the light emitted by the LED 4*a*. As a result, the transmitter 4 injects collimated light beams 7 into the window 101. The transmitter 4 and the receiver 5 are located sufficiently far from each other that the light beams 7 can be totally reflected by the window 101 multiple times at total reflection points 8 (only some are indicated in FIG. 3 to 5) before reaching the receiver 5.

As shown in FIG. 3, the receiver 5 of the rain sensor system 1 of FIG. 2 includes a lens 5*a* and a photodiode 5*b* which converts the received measurement light into an electric current. Thus, an output of the receiver 5 is an electric signal proportional to the intensity of the received light. The electric signal output by the receiver 5 is forwarded to an analysis unit 22, which determines the quantity of rain on the window 101 based on the received electric signal.

In FIG. 3, there is no rain on the window 101. As a result, the light beams 7 are all totally reflected multiple times and the light intensity received at the receiver 5 is substantially equal to the intensity emitted by the transmitter 4. On the other hand, when there are raindrops 106 on the window 101, the raindrops 106 change the reflection of the light beams 7. As a result, depending on the amount of water (or equivalently on the number of raindrops 106) on the window, some or all of the light beams 7 get partially reflected along their trajectories towards the receiver 5. As indicated in FIG. 4, at the partial reflection points 9, some of the light is not reflected and instead the light leaves the window 101. This lost light is then "missing" from the light detected by the receiver 5. Therefore, a light intensity detected at the receiver 5 decreases as the rain quantity increases, allowing the analysis unit 22 to determine how much water there is on the window 101.

The multiple reflections of the light beams 7 in the window 101 increases the accuracy of the rain sensor system 1.

An optical alignment of the transmitter 4 with respect to the receiver 5 does not need to be performed very accurately. Indeed, as shown in FIG. 5, a slight divergence (a few degrees, preferably less than 6°) in the injected light result in a constant shift in some of the light beams 7. Although the light intensity received at the receiver 5 is reduced in such a case, this can be compensated by increasing the emitted light intensity on the transmitter's 4 side. The detection of the amount of rain on the window 101 can be performed along the same lines as described in view of FIGS. 3 and 4 above in case of the slight divergence of FIG. 5.

Although FIGS. 4 and 5 do not explicitly show the LED 4*a*, the lens 4*b*, the lens 5*a*, the photodiode 5*b* and the analysis unit 22, the transmitter 4, the receiver 5 and the analysis unit 22 are actually identical with those of FIG. 3.

Figure 6:
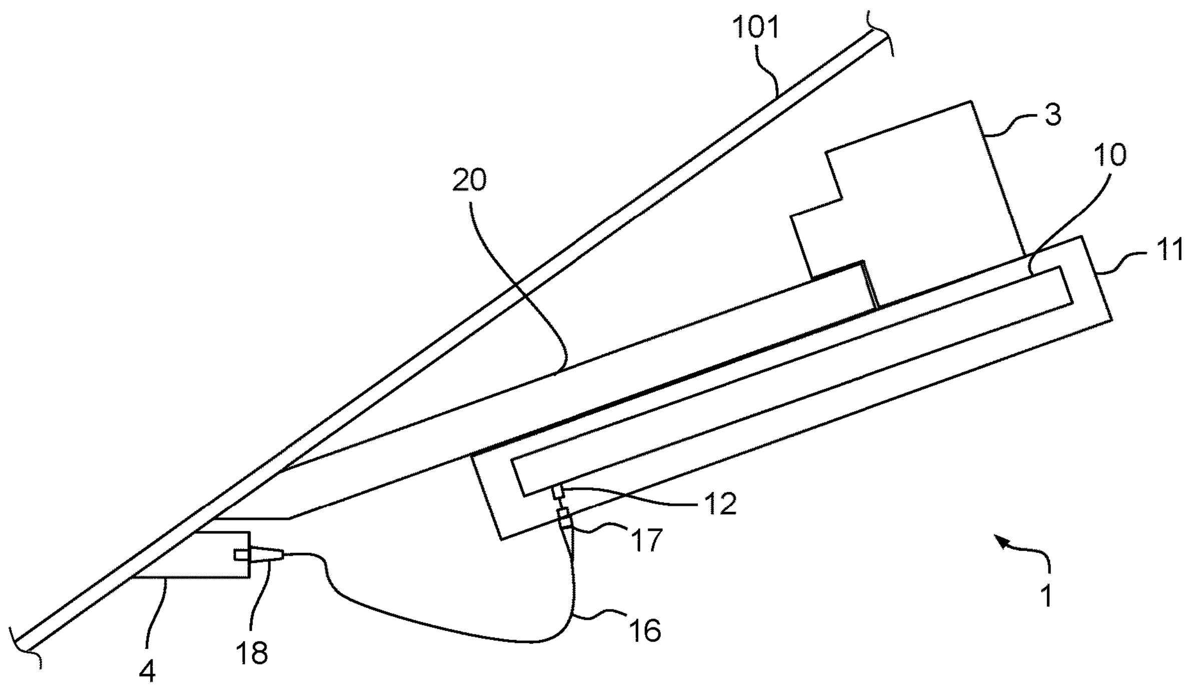
FIG. 6 shows a rain sensor system according to a second embodiment.

As an alternative to the rain sensor system 1 of the first embodiment (FIG. 2), a rain sensor system 1 according to a second embodiment can be mounted behind the window 101 of the car 1 of FIG. 1. Such a rain sensor system 1 according to the second embodiment is shown in FIG. 6.

The difference between the rain sensor system 1 of the first embodiment (FIG. 2) and the rain sensor system 1 of the second embodiment (FIG. 6) is that in the first embodiment, the transmitter 4 emits the light itself and the receiver 5 analyses or emits an electric signal corresponding to the detected intensity itself. On the other hand, in the second embodiment (FIG. 6), the transmitter 4 only transmits light received from the camera device 2 and the receiver 5 only forwards the received measurement light towards the camera device 2 for analysis thereof. The transmitter 4 and the receiver 5 of the second embodiment do not include any electronics, but merely optical components. Like in the first embodiment, in the second embodiment, the receiver 5 and the camera optics 3 are different components.

Figure 7:
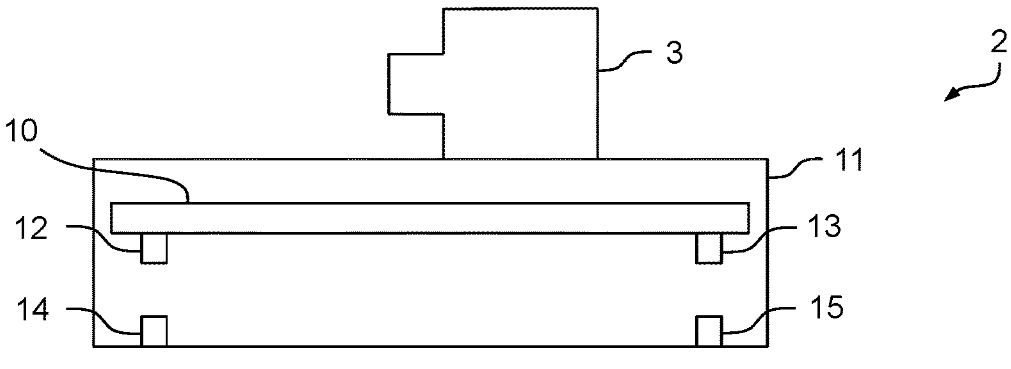
FIG. 7 shows a camera device for the rain sensor system of FIG. 6.

In detail, as shown in FIG. 7, the camera device 2 of the rain sensor system 1 of the second embodiment includes a processor unit 10 mounted within a housing 11. The processor unit 10 is a printed circuit board (PCB) configured to control the operation of the camera optics 3 to capture images of the area 102. Further, the processor unit 10 comprises a light emitting element 12, here an LED, and a light receiving element 13, here a photodiode.

Figure 8:
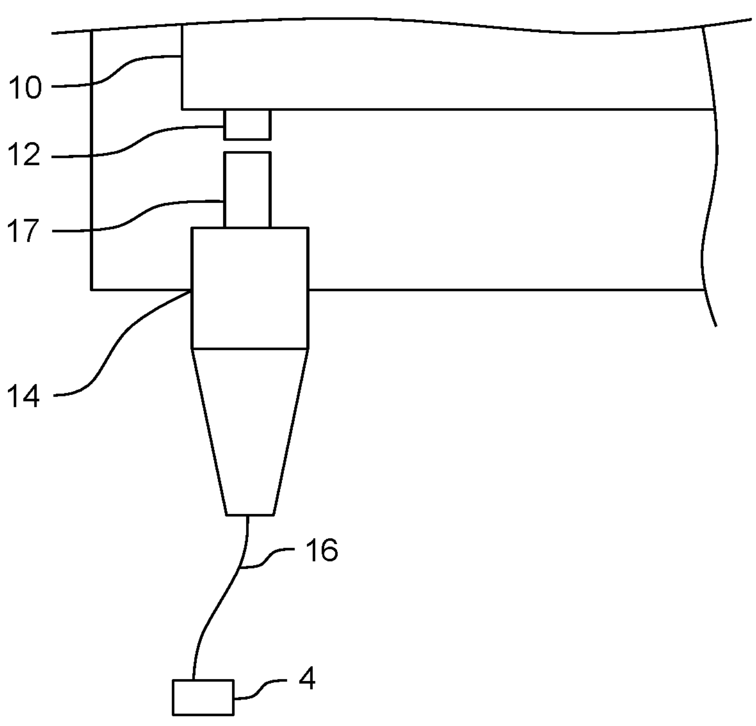
FIG. 8 shows a detailed view of an optical connection in the camera device of FIG. 7.

As shown in FIG. 7, the housing 11 includes a first optical fiber interface 14 and a second optical fiber interface 15 for connecting optical fibers 16. In detail, as shown in FIG. 8, an optical fiber connector 17 is insertable into the first optical fiber interface 14. Light emitted by the LED 12 is guided through the optical fiber connector 17 into the optical fiber 16. As shown in FIGS. 6 and 8, the other end of the optical fiber 16 is connected to the transmitter 4. An optical fiber connector 18 is used to couple the optical fiber with the transmitter 4. In the second embodiment, the transmitter 4 includes a prism 19 as a first optical element (see FIG. 9). The light emitted by the LED 12 is thus guided towards the transmitter 4 through the first optical fiber 16, collimated by the prism 19 and injected into the window 101.

Figure 9:
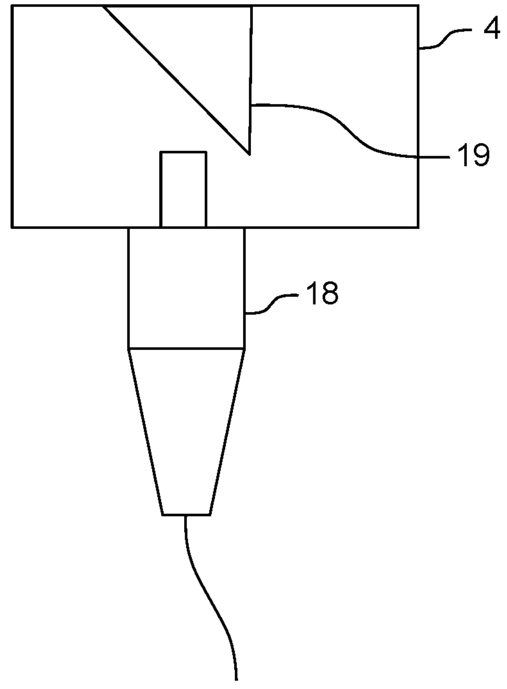
FIG. 9 shows an example of a connection on a transmitter side of the rain sensor system of FIG. 6.

Although not shown in the figures, the connection between the light receiving element 13 and the receiver 5 is equivalent to the connection between the light emitting element 12 and the transmitter 4 shown in FIGS. 8 and 9. In particular, a second light fiber (not shown) connects the light receiving element 13 and the receiver 5. Connectors similar to the optical fiber connectors 17, 18 are used for the connections between the optical fiber and the light receiving element 13 and between the optical fiber and the receiver 5. The receiver 5 may include a second optical element for bundling the received measurement light. The receiver 5 transmits the received measurement light to the light receiving element 13 through the second optical fiber. The light receiving element 13 generates an electric signal in accordance with the received measurement signal.

Advantageously, the rain sensor 6 does not need to be electrically powered and does not need to emit the light signal and perform the analysis on the measurement light signal itself. Instead, processor resources are shared with the camera device 2. This reduces the costs, complexity and size of the rain sensor system 1 of the second embodiment.

The propagation of the light through the window 101 is the same in the second embodiment as in the first embodiment (FIG. 3 to 5).

While the present technology has been described in connection with several practical examples, it is to be understood that the technology is not to be limited to the disclosed examples, but on the contrary, is intended to cover various modifications and equivalent arrangements. For example, the vehicle may be a train, truck or the like instead of a car. The rain sensor system 1 could be mounted at the back 108 of the vehicle 100 instead of at the front 107 (see FIG. 1). Instead of using a prism 19 as the first optical element, free-form optics or a diffractive optical element can be used. The positioning of the transmitter 4 and receiver 5 can be different than shown in FIG. 2. For example, the transmitter 4 and receiver 5 can be placed above and below the camera device 2. The transmitter 4 and the receiver 5 can further be at least partly incorporated into the camera cover 20. Further, additional features such as ambient light sensing can be performed either using the rain sensor 6 or using the camera device 2.

REFERENCE SIGNS

1 rain sensor system
2 camera device
3 camera optics
4 transmitter
4*a* LED
4*b* lens
5 receiver
5*a* lens
5*b* photodiode
6 rain sensor
7 light beam
8 total reflection point
9 partial reflection point
10 processor unit
11 housing
12 light emitting element
13 light receiving element
14 first optical fiber interface
15 second optical fiber interface
16 first optical fiber
17, 18 optical fiber connector
19 prism
20 camera cover
21 side
22 analysis unit
100 vehicle
101 window
102 surrounding area
103 camera's field of view
104 interior
105 exterior
106 rain drop
107 front
108 back
d distance

The invention claimed is:

1. A rain sensor system for measuring a quantity of rain on a window of a vehicle, the rain sensor system comprising:
- a camera device comprising a printed circuit board, the camera device configured to capture images of an area surrounding the vehicle using camera optics;
- a camera cover configured to at least partially cover the camera device; and
- a rain sensor including a transmitter and a receiver, the transmitter being configured to emit or transmit light, and the receiver being an opto-electronic component configured to receive measurement light that is emitted or transmitted by the transmitter and guided to the receiver by the window,
- wherein the transmitter and the receiver are arranged at a distance from each another,
- wherein the transmitter and the receiver are arranged in, on, or along one or several edges of the camera cover or in one or several openings in the camera cover,
- wherein the transmitter and the receiver are arranged on opposite edges of the camera cover or on different extremities of the same edge,
- wherein the transmitter and the receiver are mechanically supported by the camera cover and not mounted to the printed circuit board, and
- wherein the receiver and the camera optics of the camera device are different components that are optically independent of each other.

2. The rain sensor system according to claim 1,
further including an analysis unit which is configured to analyze the received measurement light to determine the quantity of rain on the window.

3. The rain sensor system according to claim 2,
wherein the transmitter and the receiver are arranged on the window such that the light that is emitted or transmitted by the transmitter is reflected by total reflection at least once on an outer surface of the window and at least once on an inner surface of the window.

4. The rain sensor system according to claim 3,
wherein the transmitter and the receiver are mechanically independent elements, or the transmitter and the receiver are not attached to each other or the transmitter and the receiver are not housed in a same housing.

5. The rain sensor system according to claim 4,
wherein the transmitter and the receiver are arranged along different sides of the camera device.

6. The rain sensor system according to claim 1,
wherein the transmitter or the receiver are configured to be moved independently of a camera cover or the camera device.

7. The rain sensor system according to claim 1,
wherein the transmitter includes a light emitting diode, for emitting the light or an optical element for collimating the emitted light; or
the receiver includes an optical element for bundling the received measurement light.

8. The rain sensor system according to claim 7,
wherein the light emitted by the transmitter has a divergence between 3 and 6 degrees.

9. The rain sensor system according to claim 1, further including a processor unit for electrically powering or controlling the transmitter and/or the receiver and the camera device.

10. The rain sensor system according to claim 1, wherein:

the camera device includes a light emitting element configured to emit light or a light receiving element configured to receive light; and the light emitting element is connected to the transmitter through a first optical fiber configured to transmit the light emitted by the light emitting element to the transmitter or the light receiving element is connected to the receiver through a second optical fiber configured to transmit the measurement light received by the receiver to the light receiving element.

11. The rain sensor system according to claim 9, wherein the processor unit further includes a determination element for determining an amount of rain of the window based on the light received by the light receiving element, or wherein a light emitting element or the light receiving element are part of the processor unit.

12. A vehicle comprising the rain sensor system according to claim 1.

13. The rain sensor system according to claim 1, wherein the receiver is further configured to analyze the received measurement light or emit an electric signal corresponding to the received measurement light.

14. The rain sensor system according to claim 1, wherein the receiver is further configured to forward the received measurement light towards the camera device, and wherein the camera device is further configured to analyze the received measurement light.

* * * * *